United States Patent
Knoblauch

(10) Patent No.: US 10,708,876 B2
(45) Date of Patent: Jul. 7, 2020

(54) SYSTEM AND METHOD FOR DETERMINING LOCATION INFORMATION FOR A MOBILE RADIO TRANSMITTER

(71) Applicant: LEGIC Identsystems AG, Wetzikon (CH)

(72) Inventor: Thomas Knoblauch, Jona (CH)

(73) Assignee: LEGIC IDENTSYSTEM AG (CH)

(*) Notice: Subject to any disclaimer, the term of this patent is extended or adjusted under 35 U.S.C. 154(b) by 0 days.

(21) Appl. No.: 15/928,253

(22) Filed: Mar. 22, 2018

(65) Prior Publication Data
US 2018/0279253 A1    Sep. 27, 2018

(30) Foreign Application Priority Data
Mar. 23, 2017   (CH) ............................. 381/17

(51) Int. Cl.
*G01S 3/28*   (2006.01)
*H04W 64/00*   (2009.01)
(Continued)

(52) U.S. Cl.
CPC .......... *H04W 64/00* (2013.01); *G01S 3/043* (2013.01); *G01S 3/28* (2013.01); *G01S 5/0054* (2013.01);
(Continued)

(58) Field of Classification Search
CPC ... H04W 64/006; H04W 64/00; G01S 13/583; G01S 13/58; H01Q 1/38; H01Q 9/0407;
(Continued)

(56) References Cited

U.S. PATENT DOCUMENTS 6,188,913 B1 * 2/2001 Fukagawa ............ H01Q 3/2605
455/562.1
6,333,713 B1 * 12/2001 Nakagawa ................. G01S 3/74
342/417
(Continued)

FOREIGN PATENT DOCUMENTS

CN    102170697 A    8/2011
WO    WO 2016/000121 A1    1/2016

OTHER PUBLICATIONS

Uluskan et al. ,"RSS Based Direction Finding via Array of Directional Antennas with Normal Density Distribution in Magnitude", IEEE 2017 10$^{th}$ International Conference on Electrical and Electronics Engineering, Nov.-Dec. 2017, pp. 656-660.*

*Primary Examiner* — Said M Elnoubi
(74) *Attorney, Agent, or Firm* — Ostrolenk Faber LLP

(57) ABSTRACT

A positioning system (10) for determining location information of/for a mobile radio transmitter (1) comprises an antenna system (2) which includes a plurality of antennas (21) aimed at different directions and arranged on one common antenna carrier (20). The positioning system (10) comprises a receiver system (3) electrically connected to the antennas (21) and configured to receive via each of the antennas (21) a radio signal (7) transmitted by the mobile radio transmitter (1). The positioning system (10) further comprises a processing circuit (4) electrically connected to the receiver system (3) and configured to calculate the location information of/for the mobile radio transmitter (1) based on the radio signal received at each of the antennas (21). The location information includes at least angular direction of the mobile radio transmitter (1) with respect to the antenna system (2).

18 Claims, 4 Drawing Sheets

(51) Int. Cl.
*H04B 7/02* (2018.01)
*G01S 5/02* (2010.01)
*G01S 3/04* (2006.01)
*G01S 5/00* (2006.01)
*G01S 19/37* (2010.01)
*H04B 7/08* (2006.01)
*G01S 5/12* (2006.01)
*G01S 11/06* (2006.01)
*H04B 17/318* (2015.01)

(52) U.S. Cl.
CPC .............. *G01S 5/02* (2013.01); *G01S 5/0221* (2013.01); *G01S 5/12* (2013.01); *G01S 11/06* (2013.01); *G01S 19/37* (2013.01); *H04B 7/02* (2013.01); *H04B 7/08* (2013.01); *H04W 64/006* (2013.01); *H04B 17/318* (2015.01)

(58) Field of Classification Search
CPC ........ H01Q 15/0086; H01Q 1/36; H01Q 9/40; H01Q 1/243; H01Q 9/28; H01Q 5/307; H01Q 5/40; H01Q 11/10; H01Q 25/00; H01Q 5/357; H01Q 5/50; H01Q 9/42; H01Q 1/241; H01Q 5/371
See application file for complete search history.

(56) References Cited

U.S. PATENT DOCUMENTS

| | | | |
|---|---|---|---|
| 7,042,394 B2* | 5/2006 | Sayers | G01S 3/18 342/432 |
| 2006/0052114 A1* | 3/2006 | Cuffaro | G01S 5/02 455/456.1 |
| 2011/0183690 A1* | 7/2011 | Kobayakawa | G01S 5/0215 455/456.5 |
| 2011/0205969 A1 | 8/2011 | Ahmad et al. | 370/328 |
| 2014/0357291 A1* | 12/2014 | Leppanen | G01S 5/0278 455/456.1 |
| 2016/0227462 A1* | 8/2016 | Axmon | H04W 36/32 |
| 2017/0257877 A1* | 9/2017 | Axmon | H04B 7/024 |

* cited by examiner

SYSTEM AND METHOD FOR DETERMINING LOCATION INFORMATION FOR A MOBILE RADIO TRANSMITTER

CROSS-REFERENCE TO RELATED APPLICATION

The present application claims priority to Swiss Patent Application No. 00381/17, filed Mar. 23, 2017, the content of which is incorporated herein by reference.

FIELD OF THE INVENTION

The present invention relates to a positioning system and a method for determining location information for a mobile radio transmitter.

BACKGROUND OF THE INVENTION

The satellite based Global Positioning System (GPS) provides useful location information for devices that are equipped with respective GPS receivers. The publicly accessible GPS provides location information that is accurate enough for locating a device and its bearer within a range of a few meters. The actual accuracy users attain depends on various factors, including atmospheric effects, sky blockage, receiver quality, etc. While an accuracy of say two to three or four meters is an impressive achievement, it is not sufficient for discriminatory applications requiring "local area positioning" where two or more devices within close proximity to each other need to be identifiable and discernible on the basis of their location. Examples of such applications include wireless payment at a payment terminal, where individuals in a line up or at neighboring terminals need to be distinguished, or access control based on wireless access token systems, where individuals in front or behind an access control device, such as a door or a gate, need to be distinguished.

US 2011/205969 describes a location system which includes a plurality of beacon transmitters each positioned at a respective location. Each beacon transmitter includes a plurality of antennas positioned in a circular arrangement. Each beacon transmitter is configured to transmit an identification signal having a plurality of reference data and to transmit a directional signal from the plurality of antennas by selecting one of the antennas at a time in sequence around the circular arrangement to simulate a rotating antenna. The location system further includes a receiver configured to receive the identification signals and a plurality of Doppler-shifted directional signals each corresponding to one of the directional signals, wherein the receiver is configured to generate a plurality of time data for each received Doppler-shifted directional signal, and wherein the receiver is configured to determine a location of the receiver using each Doppler-shifted directional signal, each time data, and each identification signal received from the plurality of beacon transmitters.

WO 2016/000121 describes a multiple-layer beacon sweeping method performed by an access node and user equipment. The method comprises at least a first beacon sweeping with a first set of beams and a first coverage area and a second beacon sweeping with a second set of beams and a second coverage area, whereby the first coverage area is larger than the second coverage area.

CN 102170697 describes an indoor positioning method which acquires the signal strength transmitted by a plurality of beacon nodes received by a terminal to be positioned.

SUMMARY OF THE INVENTION

It is an object of this invention to provide a positioning system and a method for determining location information for a mobile radio transmitter. In particular, it is an object of the present invention to provide a system and a method for determining the location of a mobile radio transmitter, without the need for multiple satellites or beacon systems. More particularly, it is an object of the present invention to provide a system and a method for determining the location of mobile radio transmitters such that the mobile radio transmitters can be discerned from each other even when they are in close proximity to each other, within one or two meters, without the need for multiple satellites or beacon systems.

According to the present invention, at least some of these objects are achieved through the features of the independent claims. In addition, further advantageous embodiments follow from the dependent claims and the description.

According to the present invention, at least some of the above-mentioned objects are achieved in that a positioning system, for determining location information for a mobile radio transmitter, comprises an antenna system with a plurality of antennas aimed at different directions and arranged on one common antenna carrier. The positioning system further comprises a receiver system electrically connected to the antennas and configured to receive via each of the antennas a radio signal transmitted by the mobile radio transmitter. The positioning system further comprises a processing circuit electrically connected to the receiver system and configured to calculate the location information for the mobile radio transmitter based on the radio signal received at each of the antennas. The location information includes at least the angular direction of the mobile radio transmitter with respect to the antenna system.

In an embodiment, the receiver system is further configured to determine received signal strengths of the radio signal received at each of the antennas. The processing circuit is further configured to calculate and include in the location information a distance of the mobile radio transmitter from the antenna system, using the received signal strengths of the radio signal received at each of the antennas and radio transmission characteristics of the mobile radio transmitter.

In a further embodiment, the receiver system is further configured to extract from the radio signal orientation data which indicates a current spatial orientation of the mobile radio transmitter. The processing circuit is further configured to calculate the location information for the mobile radio transmitter, using the received signal strengths of the radio signal received at each of the antennas, the current spatial orientation of the mobile radio transmitter, and the radio transmission characteristics of the mobile radio transmitter.

In an embodiment, the receiver system is further configured to extract from the radio signal orientation data which indicates spatial orientation of the mobile radio transmitter. The processing circuit is further configured to determine the radio transmission characteristics of the mobile radio transmitter using the received signal strengths of the radio signal received at various spatial orientations of the mobile radio transmitter, and to store the radio transmission characteristics for the mobile radio transmitter.

In a further embodiment, the receiver system is further configured to extract from the radio signal a device type of the mobile radio transmitter. The processing circuit is further configured to determine the radio transmission characteristics of the mobile radio transmitter from a data store using the device type of the mobile radio transmitter.

In an embodiment, the receiver system is further configured to determine propagation times of the radio signal received from the mobile radio transmitter at each of the antennas. The processing circuit is further configured to calculate a distance of the mobile radio transmitter from the antenna system using the propagation times determined at each of the antennas.

In a further embodiment, the processing circuit is further configured to calculate based on the radio signal received at each of the antennas a two-dimensional location of the mobile radio transmitter and/or a three-dimensional location of the mobile radio transmitter.

In an embodiment, the processing circuit is further configured to determine and store a movement path, including movement direction (and speed), of the mobile radio transmitter based on the location information calculated for the mobile radio transmitter, and to use the movement path of the mobile radio transmitter to calculate the location information for the mobile radio transmitter.

In a further embodiment, the receiver system is further configured to determine frequency shift of the radio signal received from the mobile radio transmitter. The processing circuit is further configured to determine a direction (and speed) of movement of the mobile radio transmitter.

In an embodiment, the processing circuit is further configured to determine whether the mobile radio transmitter is located in front of or behind an access control device.

In a further embodiment, the processing circuit is further configured to determine whether the mobile radio transmitter is located in front of or behind another mobile radio transmitter with respect to an access control device.

In an embodiment, at least some of the antennas have spatial directivity.

In a further embodiment, the antenna system comprises three or more antennas in a triangular arrangement.

In an embodiment, the antenna system comprises two antennas in a parallel or antiparallel arrangement.

In a further embodiment, the antenna system and the receiver system are configured to receive radio signals transmitted by a mobile radio transmitter of a wireless local area network, a Bluetooth transceiver, and/or a Zigbee transceiver.

In an embodiment, the processing circuit is configured to calculate the angular direction of the mobile radio transmitter with respect to the antenna system by determining a sector in which the mobile radio transmitter is located with respect to the antenna system, using minimum and/or maximum signal strengths of the radio signal received at each of the antennas; and calculating the angular direction of the mobile radio transmitter with respect to the antenna system, using the signal strengths of the radio signal received at the antennas located (at least partially) in the determined sector.

In addition to the positioning system, the present invention also relates to a method of determining location information for a mobile radio transmitter. The method comprises arranging a plurality of antennas on one common antenna carrier and aimed at different directions; receiving by a receiver system via each of the antennas a radio signal transmitted by the mobile radio transmitter; calculating by a processing circuit the location information for the mobile radio transmitter based on the radio signal received at each of the antennas, the location information including at least angular direction of the mobile radio transmitter with respect to the antenna system.

In an embodiment, the method further comprises the receiver system determining received signal strengths of the radio signal received at each of the antennas; and the processing circuit calculating a distance of the mobile radio transmitter from the antenna system, using the received signal strengths of the radio signal received at each of the antennas and radio transmission characteristics of the mobile radio transmitter.

In a further embodiment, the method further comprises the receiver system determining propagation times of the radio signal received from the mobile radio transmitter at each of the antennas; and the processing circuit calculating a distance of the mobile radio transmitter from the antenna system using the propagation times determined at each of the antennas.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
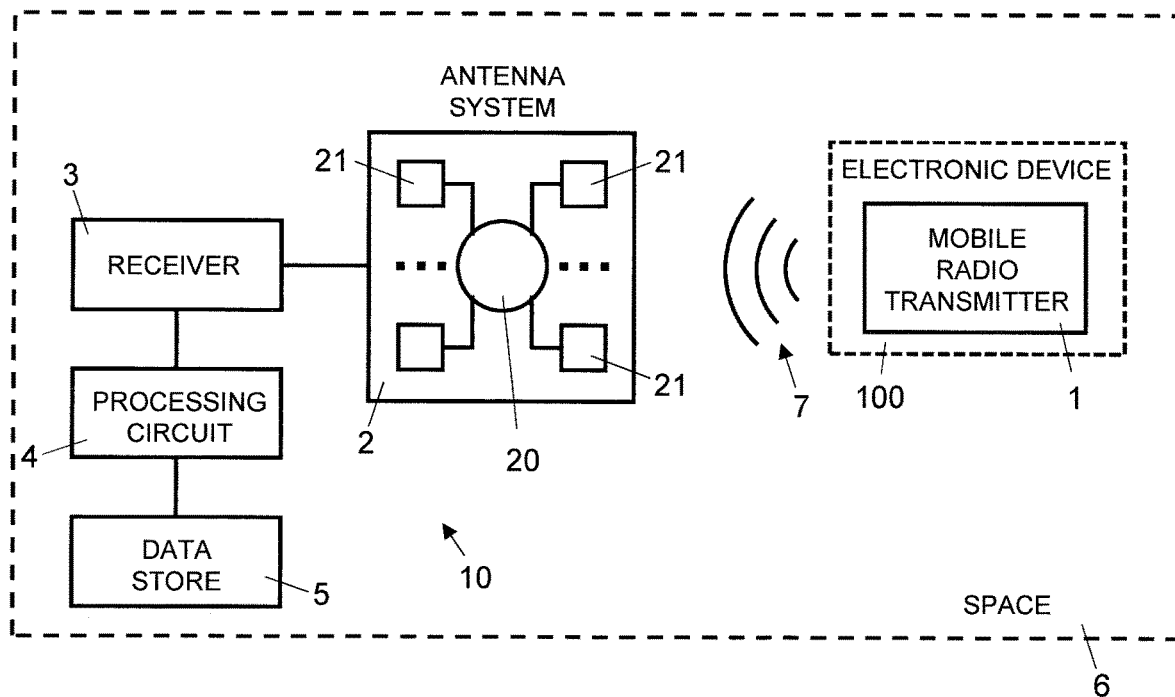
FIG. 1: shows a block diagram illustrating schematically a positioning system for determining location information for a mobile radio transmitter.

In FIG. 1, reference numeral 10 refers to a positioning system for determining location information for a mobile radio transmitter 1. Specifically, the positioning system 10 is configured to determine location information indicating the location of the mobile radio transmitter 1, e.g. within a space 6 of a local area extending up to 100-400 meters in any direction, with a precision that enables discerning mobile radio transmitters 1 that are located in close proximity to each other within an area of 1-2 square meters.

The mobile radio transmitter 1 is configured to generate a radio signal 7 enabling communication in a local area with a range of 1-200 meters (or more). Depending on the embodiment, the mobile radio transmitter 1 comprises a WLAN-module (Wireless Local Area Network), a Bluetooth transceiver, a Zigbee transceiver, and/or another radio-based communication module providing an RSSI value (Received Signal Strength Indicator). As illustrated schematically in FIG. 1, the mobile radio transmitter 1 is arranged in an electronic device 100, such as a radio dongle, a mobile radio phone, a cellular phone, a smart phone, a wrist-worn device, a smart watch, a tablet computer, a laptop computer, or the like.

As illustrated in FIG. 1, the positioning system 10 comprises an antenna system 2, including a plurality of antennas 21, a receiver system 3 which is electrically connected to the antenna system 2 and configured to receive via each of the antennas 21 a radio signal transmitted by the mobile radio transmitter 1. The positioning system 10 further comprises a processing circuit 4 electrically connected to the receiver system 3 and configured to calculate the location information for the mobile radio transmitter 1 based on the radio signal received at each of the antennas 21, as will be explained later in more detail. The processing circuit 4 comprises an application specific circuit (ASIC), a programmed (micro-)processor, or another electronic circuit connected to a data store 5 and configured to calculate the location information of or for the mobile radio transmitter 1, respectively.

Figure 2:
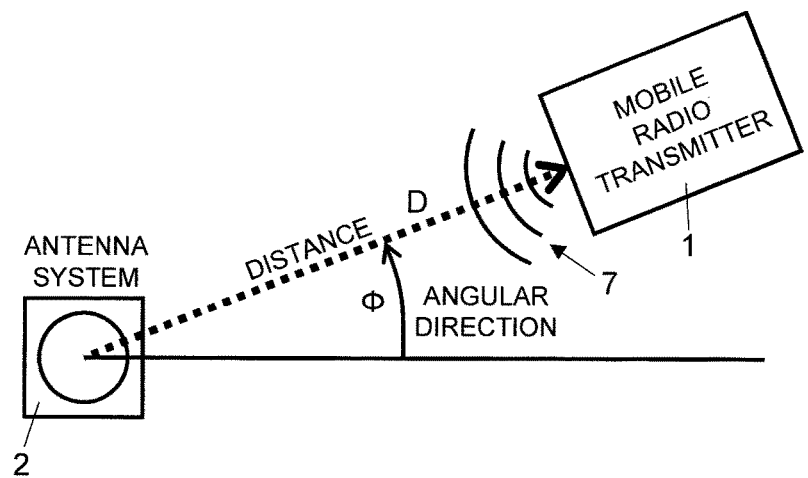
FIG. 2: shows a block diagram illustrating schematically angular direction and distance of a mobile radio transmitter with respect to an antenna system of a positioning system.

As illustrated in FIG. 2, the location information includes the angular direction $\phi$ of the mobile radio transmitter 1 with respect to the antenna system 2. In some embodiments, the location information further includes the distance D of the mobile radio transmitter 1 from the antenna system 2. As one skilled in the art will understand, from the relative location information, indicating the angular direction $\phi$ and distance D of the mobile radio transmitter 1 with respect to the antenna system 2, an absolute location of the mobile radio transmitter 1 can be determined, using the (known) location of the antenna system 2.

As illustrated in FIGS. 1 and 3-6, the plurality of antennas 21 of the antenna system 2 are arranged on and fixed to a common antenna carrier 20. The antennas 21 are implemented as patch antennas or other antennas with spatial directivity. As illustrated in FIGS. 3-6, the antennas 21 of the antenna system 2 are aimed at different directions v1, v2, v3, v4, v5, v6, v7, v8.

Figure 3:
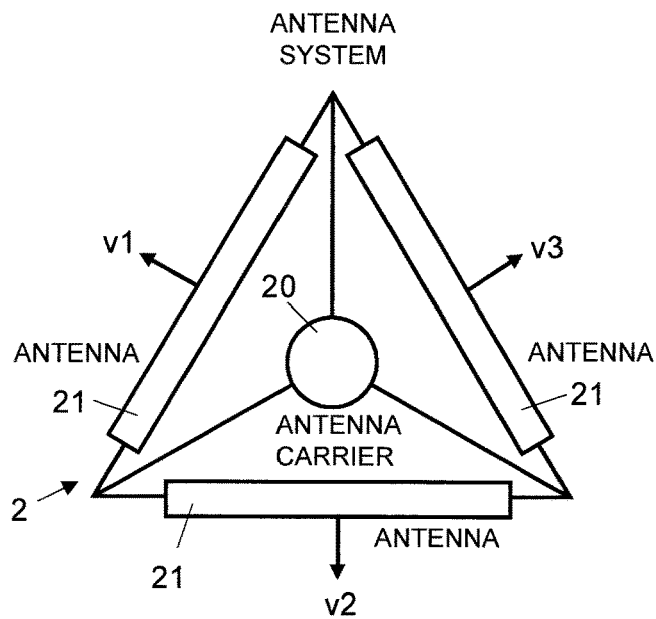
FIG. 3: shows a block diagram illustrating schematically a top view of an antenna system with a triangular arrangement of three antennas aimed at different directions, the axes of direction running in a common plane, enabling 2D positioning.

FIG. 3 illustrates an embodiment an antenna system 2 which enables two-dimensional (2D) positioning of the mobile radio transmitter 1, using an arrangement of antennas 21 aimed at different directions where the axes of direction v1, v2, v3 run in a common plane (the drawing plane). One skilled in the art will understand that 2D positioning is possible with three and more antennas in various geometric arrangements, as long as their axes of direction v1, v2, v3 run in one common plane. The specific embodiment shown in FIG. 3 uses a triangular arrangement of the antennas 21, i.e. they are arranged on a triangular antenna carrier 20 and/or their axes of direction v1, v2, v3 run parallel to the sides of a triangle.

Figure 4:
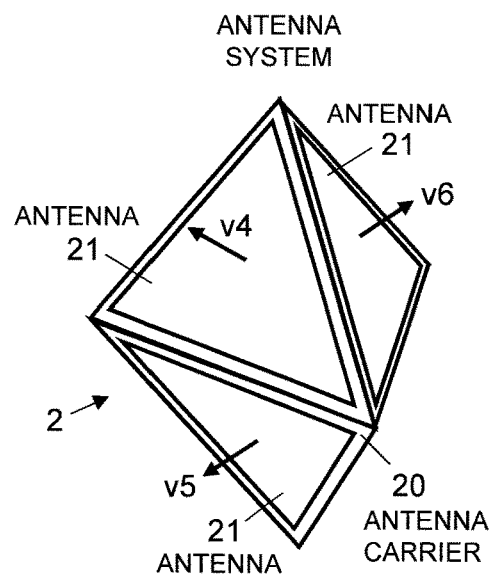
FIG. 4: shows a perspective diagram illustrating schematically an antenna system with several antennas aimed at different directions where the axes of direction do not run in one common plane, enabling 3D positioning.

FIG. 4 illustrates an embodiment an antenna system 2 which enables three-dimensional (3D) positioning of the mobile radio transmitter 1, using an arrangement of antennas 21 aimed at different directions where the axes of direction v4, v5, v6 do not run in one common plane. One skilled in the art will understand that 3D positioning is possible with four and more antennas in various geometric arrangements, e.g. pyramidal, tetrahedral, or in the shape of another polyhedron forming a quasi-spherical shape, as long as their axes of direction v4, v5, v6 do not all run in a common plane.

Figure 5:
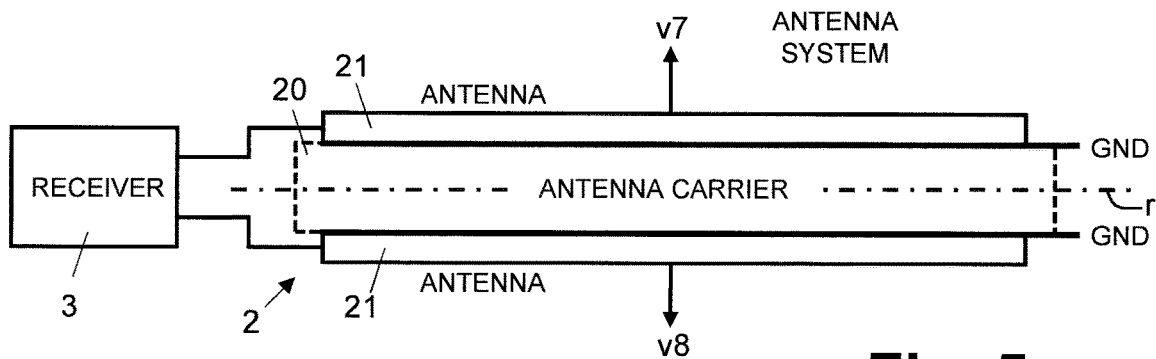
FIG. 5: shows a block diagram illustrating schematically a top view of an antenna system with antiparallel arrangement of two antennas having separate electrical grounds.
Figure 6:
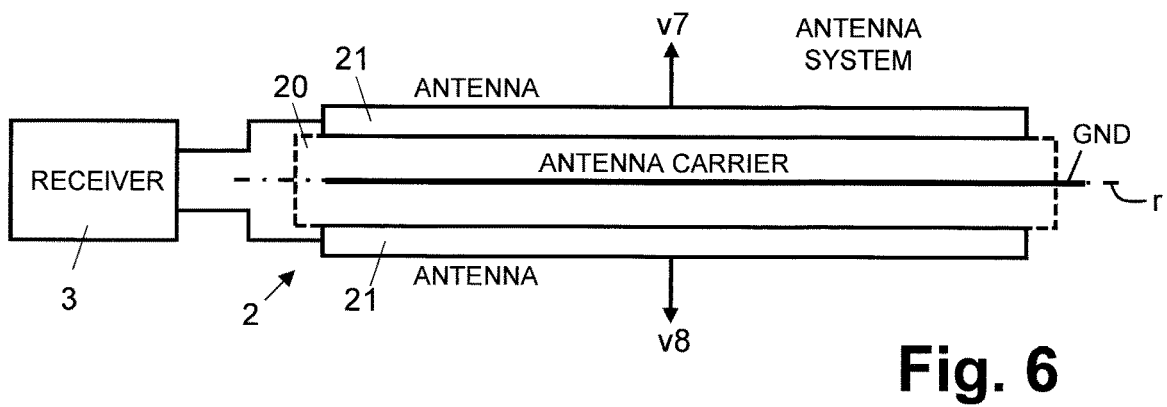
FIG. 6: shows a block diagram illustrating schematically a top view of an antenna system with antiparallel arrangement of two antennas sharing a common electrical ground.

FIGS. 5 and 6 illustrate the receiver system 3 of the positioning system 10 connected to an antenna system 2 comprising two antennas 21 attached to an antenna carrier 20 in anti-parallel configuration, their axes of direction v7, v8 pointing in opposite directions. In the configuration of FIG. 5, the two antennas 21 have their own separate ground (backing) GND; in the configuration of FIG. 6, the two antennas 21 share one common ground (plate) GND. The two antennas 21 of the antenna system 2 of FIGS. 5 and 6 enable one-dimensional (1D) directional positioning; they make it possible to determine whether the mobile radio transmitter 1 is located in front or behind a reference line or a reference plane r running normal to the axes of direction v7, v8. In a further embodiment, the antenna system 2 comprises two antennas 21 in parallel configuration, i.e. their axes of direction run parallel to each other and point in the same direction (the two parallel antennas 21 are thus aimed at different "targets" and therefore still considered at being aimed at different directions). Finally in a further embodiment, the two antennas 21 are at angular configuration, their axes of direction running at an angle to each other.

In the following paragraphs, described with reference to FIG. 6 are possible sequences of steps for determining transmission characteristics for the mobile radio transmitter 1. The transmission characteristics of a mobile radio transmitter 1 are determined during a calibration phase, e.g. by a user or a manufacturer.

In step S1, the mobile radio transmitter 1 determines its spatial orientation. Specifically, a processor of the mobile radio transmitter 1 uses gyro-sensors to determine the spatial orientation of the mobile radio transmitter 1. The spatial orientation defines the cardanic position of the mobile radio transmitter 1. Depending on the embodiment, the mobile radio transmitter 1 comprises one or more further sensors, e.g. a G-Sensor, an electronic compass, an acceleration sensor, and/or a rotation sensor. The G-Sensor produces information about the spatial orientation of the mobile radio transmitter 1 itself. Using the information of the G-Sensor, the actual antenna gain is calculated from recorded transmission characteristics. The electronic compass is used to determine the relative transmission orientation of the mobile radio transmitter 1. Typically, the initial orientation of the mobile radio transmitter 1 with respect to the antenna system 2 is not known. Owing to the Earth's magnetic field there is a far-point common reference. In an embodiment, the antenna system 2 comprises a magnetic field sensor to obtain this reference information. Otherwise, without a magnetic field sensor, the antenna system 2 must be aligned with respect to (true) magnetic north. While the transmission characteristics of the mobile radio transmitter 1 are recorded, the information of the acceleration sensor(s) are integrated to detect minor position shifts. The resulting change of the path loss is, thus, compensated during recording. The data is further used for compensating minor shifts of the mobile radio transmitter 1. Rotation sensors and/or G Sensors are used to assist the user during the recording of transmission characteristics of the mobile radio transmitter 1.

In step S2, the mobile radio transmitter 1 transmits its spatial orientation wirelessly to the positioning system 10. The spatial orientation of the mobile radio transmitter 1 is received by the receiver system 3 via the antennas 21 of the antenna system 2. The processing circuit 4 of the positioning system 10 records the signal strength of the radio signals received at each of the antennas 21 (determined from received signal strengths indicator RSSI or through measurement) and stores the respective signal strengths in the data store 5 assigned to the received spatial orientation. Remaining essentially in the same location, in step S4, the spatial orientation of the mobile radio transmitter 1 is changed by the user and steps S1, S2, and S3 are repeated to determine, transfer, and store the various spatial orientations of the mobile radio transmitter 1 and the respective signal strengths obtained at each of the antennas 21 of the antenna system 2. For example, the user is directed and guided by an app running on a processor of the mobile radio transmitter 1. The app displays for the user a visual feedback (e.g. based on information from the rotation sensor and/or G-Sensors mentioned above), assisting the user in determining which spatial orientation has been set and transferred and which spatial orientation is still to be set and transferred.

In step S5, from the stored spatial orientations and recorded signal strengths, the processing circuit 4 of the positioning system 10 generates the transmission characteristics for the mobile radio transmitter 1. The transmission characteristics of the mobile radio transmitter 1 indicates the influence of the spatial orientation of the mobile radio transmitter 1 on the signal strength received at the antenna system 2. The transmission characteristics are stored assigned to a device identifier or a device type indicator of the mobile radio transmitter 1.

Figure 7:
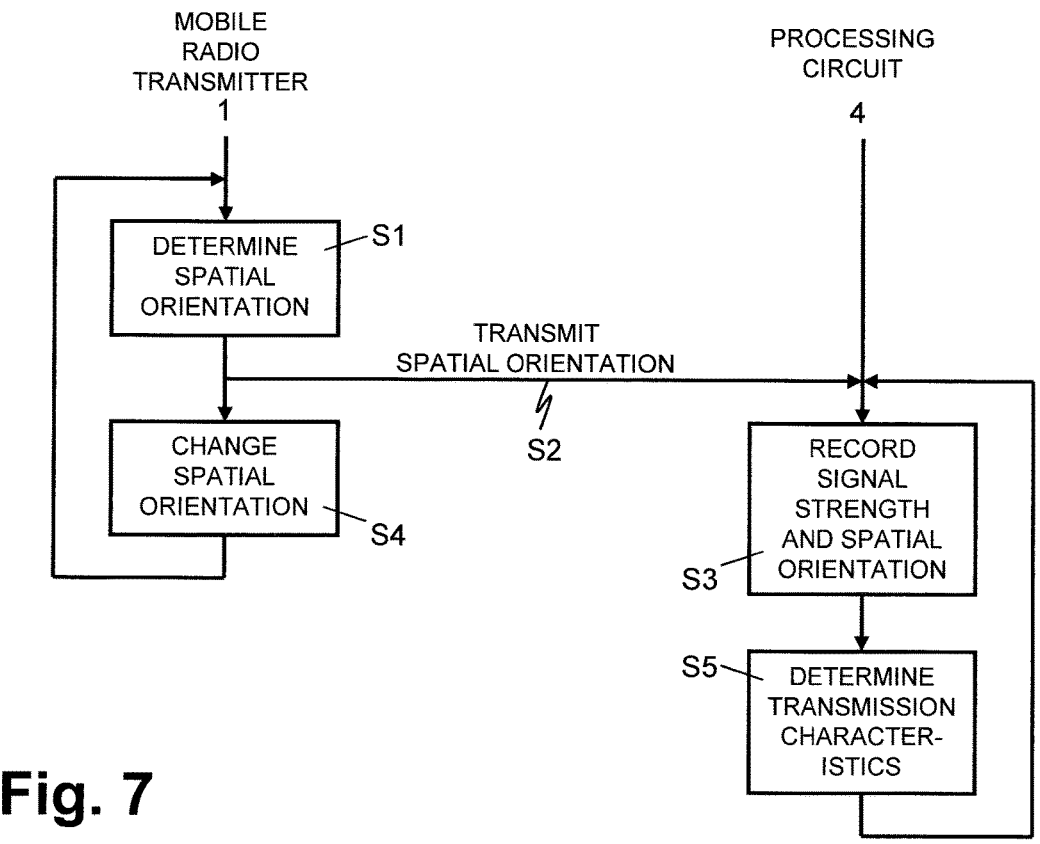
FIG. 7: shows a flow diagram illustrating an exemplary sequence of steps for determining transmission characteristics for a mobile radio transmitter.

In the following paragraphs, described with reference to FIG. 7 are possible sequences of steps for determining location information for the mobile radio transmitter 1.

In step S6, a radio signal 7 is received by the receiver system 3 of the positioning system 10 from the mobile radio transmitter 1 via all the antennas 21 of the antenna system 2.

In step S7, the receiver system 3 or the processing circuit 4, respectively, determines the characteristics of the radio signals received at each of the antennas 21.

In one embodiment, the characteristics of the radio signals include the propagation times of the radio signals at each of the antennas 21. Accordingly, in step S72, the processing circuit 4 determines the propagation times of the radio signals received at each of the antennas 21 (e.g. based on time values included at transmission time by the mobile radio transmitter). Subsequently, in step S9, the processing circuit 4 calculates the location of the mobile radio transmitter 1 (based on or including its angular direction $\phi$ and distance D with respect to the antenna system 2) from the propagation times of the radio signals at each of the antennas 21, using trigonometric functions.

In another embodiment, the characteristics of the radio signals include the frequency shift of the received radio signals. Accordingly, in step S73, the processing circuit 4 determines the frequency shift of at least one of the radio signals received at each of the antennas 21. Subsequently, in step S9, the processing circuit 4 determines from the frequency shift a direction of movement of the mobile radio transmitter 1, particularly, whether the mobile radio transmitter 1 moves towards or away from the antenna system 2.

In a further embodiment, the characteristics of the radio signals include the signals strengths of the radio signals at each of the antennas 21. Accordingly, in step S71, the processing circuit 4 determines the signal strengths of the radio signals received at each of the antennas 21. Subsequently, in step S9, the processing circuit 4 calculates the directional location, i.e. the angular direction $\phi$ of the mobile radio transmitter 1 with respect to the antenna system 2, from the signal strengths of the radio signals received at each of the antennas 21, e.g. using trigonometric functions.

An embodiment of calculating the directional location of the mobile radio transmitter 1 is described below, with reference to FIG. 9 which illustrates a scenario/configuration of an antenna system 2 comprising three antennas 21*a*, 21*b*, 21*c* in an equilateral triangle arrangement.

The behaviour of an antenna 21, 21*a*, 21*b*, 21*c* of the antenna system 2, i.e. the antenna characteristics of the antenna 21, 21*a*, 21*b*, 21*c* of the antenna system 2, is specified and described by an antenna function: gain=F($\alpha$) and its inverse function $\alpha$=F$^{-1}$(gain). In essence, the behaviour or characteristics of an antenna 21, 21*a*, 21*b*, 21*c* is specified by a so called antenna diagram in polar coordinates which shows the antenna gain in relation to the angular position of the mobile radio transmitter 1 with respect to the antenna 21, 21*a*, 21*b*, 21*c*. For the antenna function, gain=F($\alpha$), the polar antenna diagram is transformed into a Cartesian diagram with gain as a function of angular position, $\alpha$=[0° . . . 180°], also considering forward and backward gain.

Figure 9:
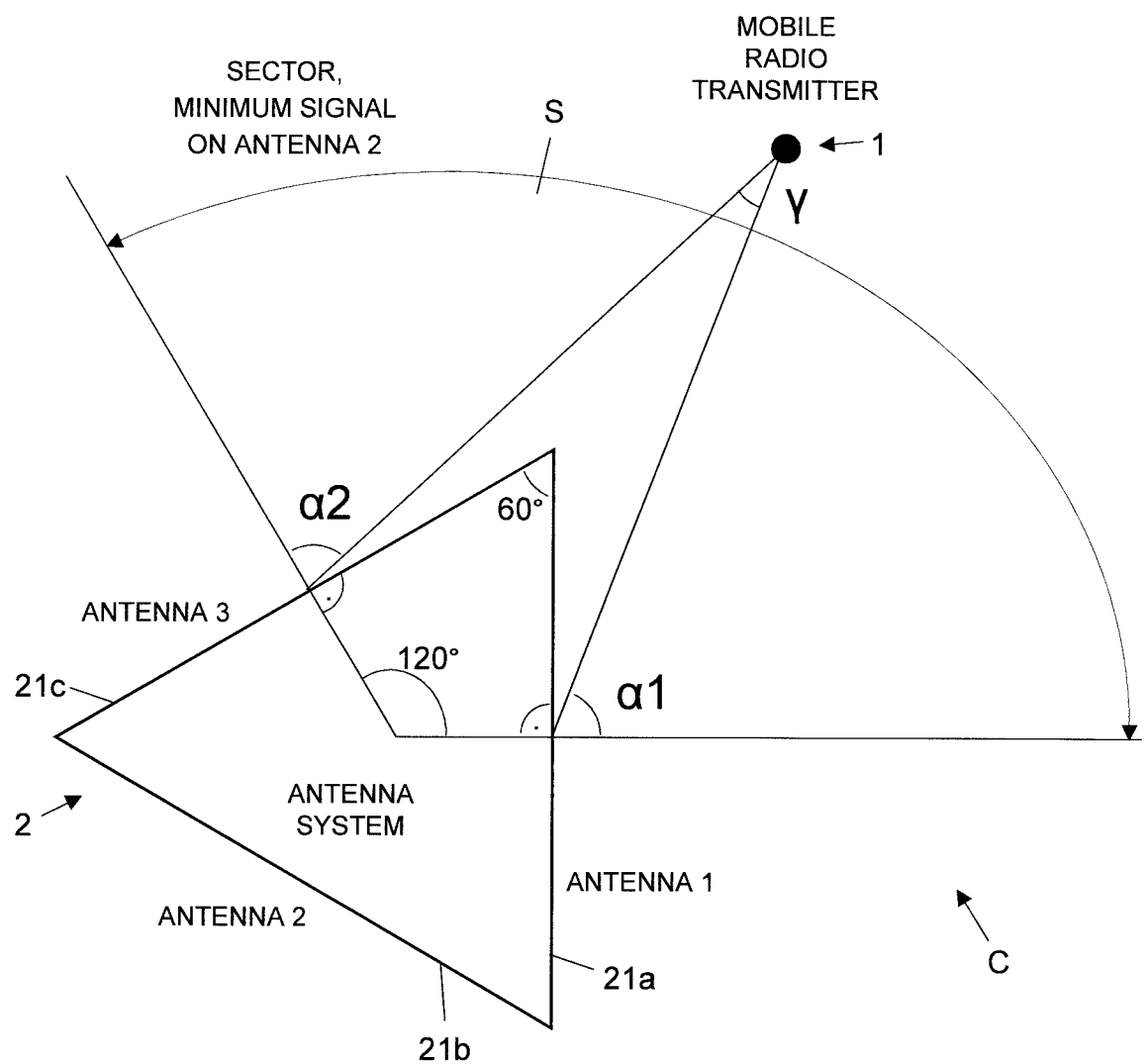
FIG. 9: shows a diagram illustrating the determination of the directional or angular location of a mobile radio transmitter, with respect to an antenna system having three antennas arranged in an equilateral triangle.

In a first step, for calculating the directional location of the mobile radio transmitter 1, the processing circuit 4 determines a sector S in which the mobile radio transmitter 1 is located in relation to the antenna system 2, using minimum and/or maximum received signal strengths at each antenna 21*a*, 21*b*, 21*c*, as illustrated in FIG. 9.

In a subsequent step, the processing circuit 4 calculates the location of the mobile radio transmitter 1 inside this sector S based on the received signal strength, using trigonometry and angle calculation and considering the antenna function F. The signal received at antenna 21*a* is RSSI1=F($\alpha$1). The angle $\alpha$1 is calculated using the inverse function $\alpha$1=F$^{-1}$(RSSI1). Likewise for antenna 21*b* the angle $\alpha$2 is calculated using the inverse function $\alpha$2=F$^{-1}$(RSSI2).

In case of a distant mobile radio transmitter 1, the angle $\gamma$ is very small, converging to 0°. One skilled in the art will see that $\alpha$2=$\alpha$1−120° and can use both $\alpha$1 and $\alpha$2 for the angular position.

In a further step, the processing circuit 4 calculates the distance of the mobile radio transmitter 1 from the antenna system 2 based on the path loss. The most relevant parameters of the link budget (e.g. transmitter power, antenna characteristics etc.) are known. One skilled in the art can calculate the distance from the path loss by using existing propagation models.

Calculating distance based on received signal strength produces significant deviations when obstacles (e.g. walls) are involved. In such cases, measuring propagation times enables more precise distance calculation.

In a further embodiment where the characteristics of the radio signals include the signal strengths of the radio signals at each of the antennas 21, in step S8, the processing circuit 4 determines the transmission characteristics for the respective mobile radio transmitter 1, e.g. by determining the transmission characteristics assigned to the particular mobile radio transmitter 1 or the respective device type of the particular mobile radio transmitter 1, as stored in data store 5 of the positioning system 10 or retrieved from a remote server. Subsequently, in step S9, the processing circuit 4 calculates the location of the mobile radio transmitter 1, including the distance D of the mobile radio transmitter 1 from the antenna system 2 in addition to the angular direction $\phi$ with respect to the antenna system 2. The distance D is calculated by the processing circuit 4 from the signal strengths of the radio signals received at each of the antennas 21, using the transmission characteristics and an indication of the current spatial orientation of the mobile radio transmitter 1, included in the radio signal 7. Specifically, from the obtained transmission characteristics, the processing circuit 4 determines the corresponding attenuation of the radio signal 7 detected at the antenna system 2, if any, at the current spatial orientation of the mobile radio transmitter 1. One skilled in the art will understand that in addition to the transmission characteristics and the spatial orientation of the mobile radio transmitter 1, calculation of the distance further depends on the reception characteristics and configuration of the antenna system 2 and its antennas 21. The reception characteristics and configuration are determined during a calibration phase at manufacturing time and stored in data store 5.

In optional step S10, the positioning system 10 transmits the location information to the mobile radio transmitter 1.

For local adjustment, the mobile radio transmitter 1 performs fine tuning during recording of the transmission characteristics of the mobile radio transmitter 1 to enhance precision that would otherwise be reduced by positional shifts of the mobile radio transmitter 1. Furthermore, the mobile radio transmitter 1 performs local adjustments or fine tuning of the location information received from the antenna system 2, by considering/compensating positional shifts detected by the sensors of the mobile radio transmitters 1, to improve system accuracy.

Figure 8:
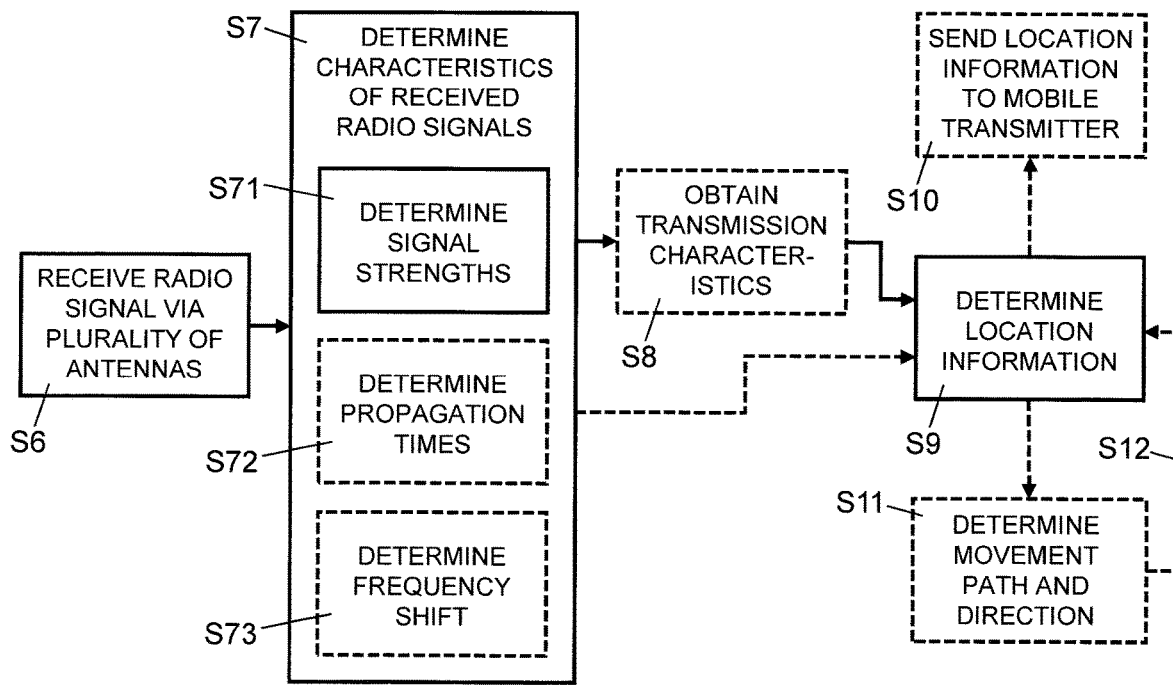
FIG. 8: shows a flow diagram illustrating an exemplary sequence of steps for determining location information for a mobile radio transmitter.

In optional step S11, the processing circuit 4 of the positioning system 10 determines a movement path, movement direction, and/or movement speed of the mobile radio transmitter 1 from a plurality of consecutively calculated locations of the mobile radio transmitter 1. For example, in a scenario where the positioning system 10 is arranged at an access control device, such as gate or a door, the positioning system 10 is configured to determine whether the mobile radio transmitter 1, and thus its user, is approaching or moving away from the access control device. As indicated schematically in FIG. 8, in an embodiment, in step S12, the processing circuit 4 uses the movement path of the mobile radio transmitter 1 to predict and/or calculate the location information for the mobile radio transmitter 1.

It should be noted that, in the description, the sequence of the steps has been presented in a specific order, one skilled in the art will understand, however, that the order of at least some of the steps could be altered, without deviating from the scope of the invention.

The invention claimed is:

1. A positioning system for determining location information for a mobile radio transmitter, the system comprising:
   an antenna system comprising two antennas arranged on one common antenna carrier in anti-parallel configuration, axes of direction of the two antennas pointing in opposite directions;
   a receiver system electrically connected to the antennas and configured to receive via each of the antennas a radio signal transmitted by the mobile radio transmitter; and
   a processing circuit electrically connected to the receiver system and configured to calculate the location information for the mobile radio transmitter based on the radio signal received at each of the antennas, the location information including whether the mobile radio transmitter is located in front or behind a reference line running normal to the axes of direction of the two antennas.

2. The positioning system of claim 1, wherein the receiver system is further configured to determine received signal strengths of the radio signal received at each of the antennas; and the processing circuit is further configured to calculate and include in the location information a distance of the mobile radio transmitter from the antenna system, using the received signal strengths of the radio signal received at each of the antennas and radio transmission characteristics of the mobile radio transmitter.

3. The positioning system of claim 2, wherein the receiver system is further configured to extract from the radio signal orientation data which indicates a current spatial orientation of the mobile radio transmitter; and the processing circuit is further configured to calculate the location information for the mobile radio transmitter, using the received signal strengths of the radio signal received at each of the antennas, the current spatial orientation of the mobile radio transmitter, and the radio transmission characteristics of the mobile radio transmitter.

4. The positioning system of claim 2, wherein the receiver system is further configured to extract from the radio signal orientation data which indicates spatial orientation of the mobile radio transmitter; and the processing circuit is further configured to determine the radio transmission characteristics of the mobile radio transmitter using the received signal strengths of the radio signal received at various spatial orientations of the mobile radio transmitter, and to store the radio transmission characteristics for the mobile radio transmitter.

5. The positioning system of claim 2, wherein the receiver system is further configured to extract from the radio signal a device type of the mobile radio transmitter; and the processing circuit is further configured to determine the radio transmission characteristics of the mobile radio transmitter from a data store using the device type of the mobile radio transmitter.

6. The positioning system of claim 1, wherein the receiver system is further configured to determine propagation times of the radio signal received from the mobile radio transmitter at each of the antennas; and the processing circuit is further configured to calculate a distance of the mobile radio transmitter from the antenna system using the propagation times determined at each of the antennas.

7. The positioning system of claim 1, wherein the processing circuit is further configured to determine and store a movement path, including movement direction, of the mobile radio transmitter based on the location information calculated for the mobile radio transmitter, and to use the movement path of the mobile radio transmitter to calculate the location information for the mobile radio transmitter.

8. The positioning system of claim 1, wherein the receiver system is further configured to determine frequency shift of the radio signal received from the mobile radio transmitter; and the processing circuit is further configured to determine a direction of movement of the mobile radio transmitter.

9. The positioning system of claim 1, wherein the processing circuit is further configured to determine whether the mobile radio transmitter is located in front of or behind another mobile radio transmitter with respect to an access control device.

10. The positioning system of claim 1, wherein at least some of the antennas have spatial directivity.

11. The positioning system of claim 1, wherein the antenna system and the receiver system are configured to receive radio signals transmitted by a mobile radio transmitter of at least one of:
    a wireless local area network,
    a Bluetooth transceiver, and
    a Zigbee transceiver.

12. The positioning system of claim 1, wherein the two antennas have their own separate ground.

13. The positioning system of claim 1, wherein the two antennas share one common ground.

14. The positioning system of claim 1, wherein the processing circuit is further configured to determine whether a user carrying the mobile radio transmitter is located in front of or behind a door.

15. The positioning system of claim 1, wherein the processing circuit is further configured to determine whether the mobile radio transmitter is located in front of or behind an access control device.

16. A method of determining location information for a mobile radio transmitter, the method comprising:
    arranging two antennas on one common antenna carrier in anti-parallel configuration, axes of direction of the two antennas pointing in opposite directions;
    receiving by a receiver system via each of the antennas a radio signal transmitted by the mobile radio transmitter of the user; and
    calculating by a processing circuit the location information for the mobile radio transmitter based on the radio signal received at each of the antennas, the location information including whether the mobile radio transmitter is located in front or behind a reference line running normal to the axes of direction of the two antennas with respect to the antenna system.

17. The method of claim 16, wherein the method further comprises the receiver system determining received signal strengths of the radio signal received at each of the antennas; and the processing circuit calculating a distance of the mobile radio transmitter from the antenna system, using the received signal strengths of the radio signal received at each of the antennas and radio transmission characteristics of the mobile radio transmitter.

18. The method of claim 16, wherein the method further comprises the receiver system determining propagation times of the radio signal received from the mobile radio transmitter at each of the antennas; and the processing circuit calculating a distance of the mobile radio transmitter from the antenna system using the propagation times determined at each of the antennas.

* * * * *